April 11, 1961

J. A. MOUNT 2,979,293

COOLING FOR SUPERSONIC AIRCRAFT

Filed March 2, 1956

INVENTOR
*JAY A. MOUNT*

BY Leech & Radue

ATTORNEYS

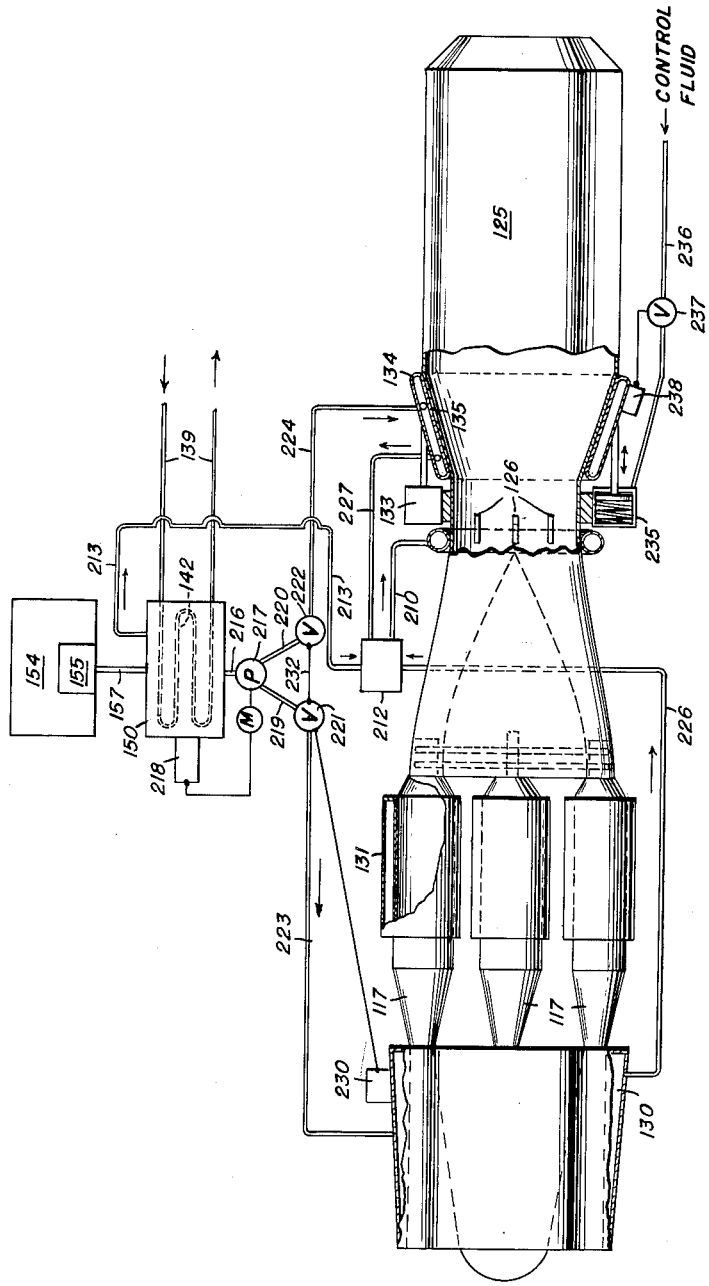

United States Patent Office 2,979,293
Patented Apr. 11, 1961

2,979,293

COOLING FOR SUPERSONIC AIRCRAFT

Jay A. Mount, 5808 Highland Drive, Kenwood, Md.

Filed Mar. 2, 1956, Ser. No. 569,095

12 Claims. (Cl. 244—117)

This invention relates to self-propelled aerial craft capable of traveling at supersonic speeds, and more particularly to novel methods of and apparatus for cooling vulnerable portions of such craft subject to damage by high temperatures resultant from impact and friction of atmospheric air on exposed surfaces thereof.

The invention further relates to use of the craft's propulsive fuel to effect cooling in a system capable of using both sensible and latent heats of the fuel and thereby providing sufficient regeneration to substantially enhance the total thrust of the power plant and materially improve its thermal efficiency.

It is a general object of the present invention to provide novel and improved methods of and apparatus for cooling vlunerable, aerodynamically heated, aircraft components by the transfer therefrom to the propulsive fuel, at substantially the rate of its consumption, the heat necessary to convert it to the vapor phase.

It is an important object of the invention to achieve aircraft component cooling by the evaporation of a liquid propulsive fuel therefor.

As a corollary to the above it is an important object of the invention to actuate the propulsive apparatus of the aircraft by the combustion of normally liquid fuel in a vaporized state.

Another important object of the invention consists in the vaporization of at least a portion of the liquid fuel used by high speed aircraft, in the absence of oxidizing agents, by the transfer thereto of aerodynamically generated heat.

A corollary object is the provision for the operation of aircraft engines, of the jet propulsion type, by the thus vaporized fuel and/or liquid fuel dependent on the immediate conditions of use.

Still another important object of the invention comprises the operation of the basic jet engine in a more or less conventional manner on liquid fuel and the afterburner on fuel vaporized by the application of aerodynamic heat.

A further important object of the invention resides in arrangements for selective and regulated heat interchange between various parts of the propulsive unit and the fuel therefor to provide added thrust by regeneration and effect vapor supply, in quantity beyond that obtainable from the aerodynamic heating available at some stages of the aircraft operation.

A still further object of the invention consists in the provision of refrigeration to absorb aerodynamic heat from vulnerable aircraft components achieved by the evaporation of liquid propulsive fuel for the craft plus mechanical compression and expansion.

Among the additional principal features of the invention may be enumerated the following:

Selective or simultaneous burning of liquid and vaporized fuel.

Countercurrent flow of refrigerant and fuel in successive stages of fractional vaporization.

Provision of vaporizing means beyond the aerodynamic heat for operation during starting and low velocity flying.

Provision for recompressing the vapor after pressure reduction used to increase vaporization rate, to provide delivery pressure above that in combustion chambers.

Vaporization of fuel in successive stages at different temperatures and negative pressures.

Arrangements to handle unvaporized fuel fractions and condensate from temperature or pressure changes.

Control of rate of fuel supply by burner demand.

Use of separate automatically controlled liquid-vapor proportioners and regulators for the main and afterburners.

Automatic control of heat transfer from the various propulsion unit parts to liquid and vapor phases of the fuel supplied for propulsion.

Provision of effective controls for engine starting, warmup, craft takeoff, climbing, level flight, etc.

Other and further objects and features of the invention will be more apparent to those skilled in the art upon a consideration of the accompanying drawings and following specification wherein are disclosed exemplary embodiments of the invention with the understanding that such changes in and combinations of the same may be made as fall within the scope of the appended claims without departing from the spirit of the invention.

In said drawings:

Fig. 2 is a view similar to Fig. 1 but in which the main engine is operated as usual on liquid fuel and the vaporized fuel is burned solely in the after-burner.

Figure 1:
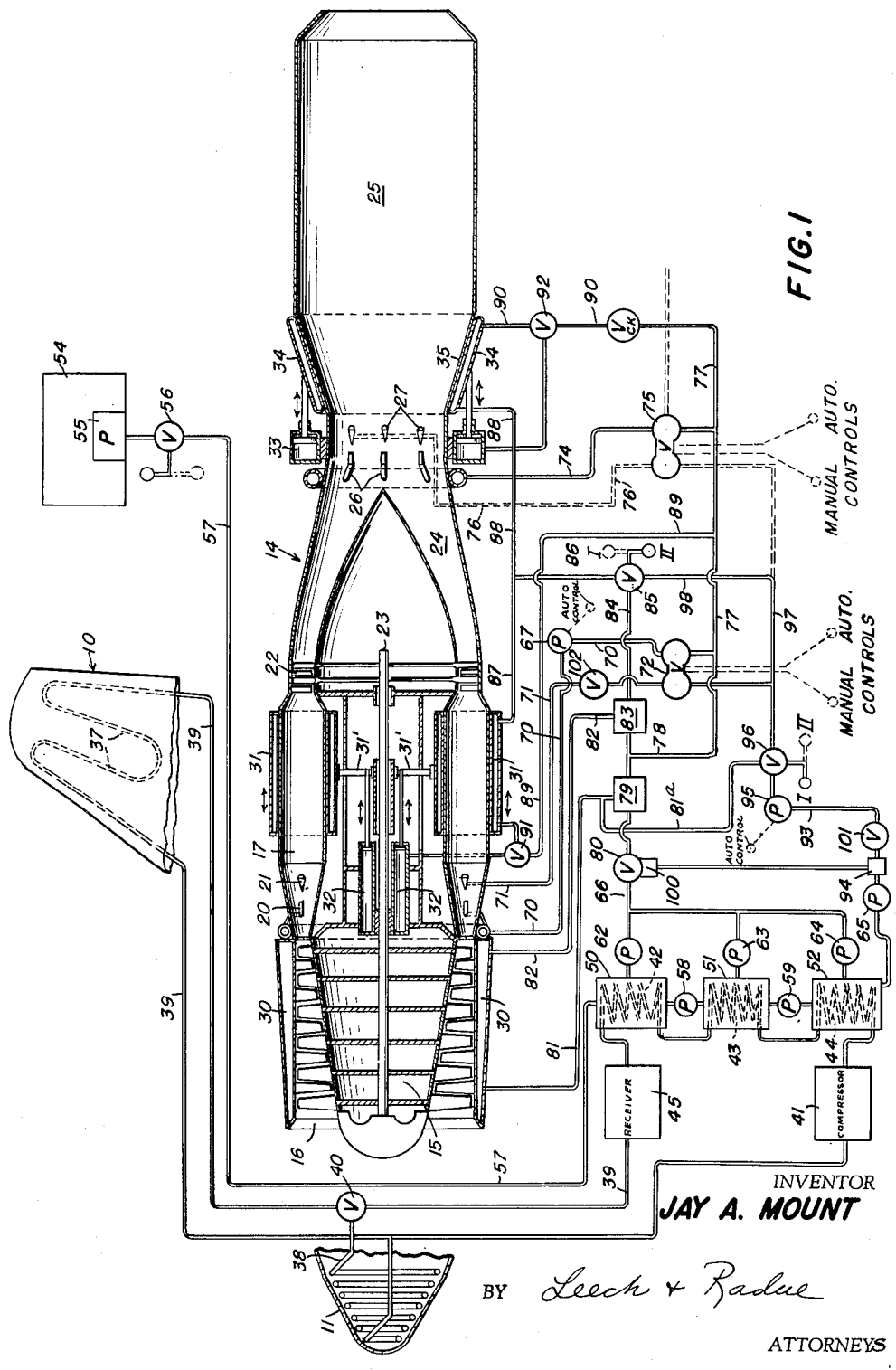
Fig. 1 is a partly schematic and diagrammatic illustration of a cooling and propulsive system shown as applied to a reaction jet engine fitted with an after-burner, the engine being shown in longitudinal central section.

In the still largely theoretical field of high speed flight for extended periods at several times the speed of sound, the greatest known obstacle at present is the so-called "thermal barrier." At such high speeds, the impact and friction of the air, even at extremely high altitudes, on the leading edges and vulnerable surfaces of aircraft of the powered missile or manned varieties may easily cause the temperatures thereof to become high enough to weaken, distort or melt metals and other materials constituting the skins and structural skeleton of the device. Other and protected parts of the craft may be even more vulnerable, namely, the instruments, tires and occupants if any. Failures of any of these components may be fatal to the completion of a mission which lasts sufficiently long for the thus generated heat to get in its work.

The principal purpose of the present invention is to provide adequate cooling wherever and whenever necessary in those parts of aircraft structure in high speed flight most vulnerable to damage from excess temperature. In achieving this purpose in accordance with the present invention improvements are effected in the propulsive equipment whereby it becomes at least a partially regenerative system capable of taking heat from the parts of the structure where it may do damage and discharging it into the working media of the power plant, increasing its enthalpy by the order of 200 B.t.u. per pound, thereby contribuiting to the total thrust and thermal efficiency of propulsion.

The operation of the system is to a large extent dependent on the use of fuel liquid at the temperature and pressure existing at take-off. It may be either of the hydrocarbon or other types, from which cooling is effected by removing from the vulnerable parts of the craft heat equivalent to the sensible as well as the latent heat of the fuel. This results in converting all or a large part of the liquid fuel into a vapor and the present invention contemplates the proper control of the overall system so that this vapor may be burned in the propulsive equipment and contribute to its overall efficiency and output.

According to present thinking the propulsive equipment for either manned or missile type aircraft for high velocity, high altitude travel will be of the jet propulsion type and may variously include the more or less conventional compressor, combuster, turbine, type of reaction jet as now used in manned aircraft, the ram jet, the pulse jet and others, all requiring a supply of highly compressed air and a suitable fuel in their operation. Converting the fuel to the vapor phase before it enters the engine for burning produces greater operating flexibility by eliminating the problems of droplet distribution and spray vaporization present in engines using fuel in the liquid phase. This also permits a substantial reduction in the pressure now required to supply the fuel and diffuse it, for this pressure can be reduced from the present several hundred pounds per square inch needed for satisfactory atomization to only a few pounds per square inch above the operating pressures prevailing in the several combustion zones. In military operation this advantage is highly appreciated because the danger of a general fire following combat damage to a fuel line would be greatly reduced.

For a better understanding of the broad concepts of the invention, reference should be had first to Fig. 1 which illustrates schematically some of the principal portions of aircraft involved in the present invention. At 10 and 11 are seen portions of the wing, nose or other structural components of the craft subject to aerodynamic heating from the impact and friction of high velocity air and requiring cooling to prevent impairment of their structural strength. The aircraft is adapted to be propelled by a more or less conventional turbo-jet engine 14 representative of any of a number of similar propulsive devices which might be used to achieve the necessary thrust for flight at the velocities and altitudes contemplated. As illustrated the engine comprises a multi-stage compressor 15 taking air through inlet 16 and compressing it in the axial-flow stages for delivery into a plurality of combustors 17 circumferentially arranged about the axis of the engine. These are shown each provided with one or more vapor fuel delivery jets 20 and one or more liquid fuel atomizing jets 21 each appropriately connected to suitable manifolds for the supply of burnable material thereto. The highly compressed air delivered to the combustors is at a substantially higher temperature than at inlet 16 due to the heat of impact, friction and compression so that fuel delivered to one or both sets of nozzles is burned in the combustors at high temperature and the resulting expanding products of combustion are forced through the multi-stage turbine 22, the rotors of which are supported on shaft 23 axially disposed in the body of the engine and fitted with appropriate bearings as illustrated. This same shaft extends to the inlet end and mounts the rotors of the compressor whereby they are driven. The products of combustion leaving the turbine, still at high temperature and velocity, are collected in the annular chamber 24 and eventually exhausted through the tail or jet pipe 25 where their effluence provides the necessary thrust or reaction for propelling the craft.

Near the junction of the annular combustion products chamber 24 and the jet tube 25 provision is made for a so-called after-burner which may include the set of nozzles 26 and their manifold for burning vaporized fuel and a second set of nozzles 27 and their manifold for supplying and burning liquid fuel. Flame holders may be provided if necessary.

In the operation of craft of the type to which the present invention applies additional power is needed both for climbing rapidly and for maintaining adequate flying velocity at extremely high altitude, and the power of the conventional engine may be materially augmented by the use of this after-burner. The fuel supplied by the jets 26 and/or 27 is burned in the excess air remaining after combustion in the combustors 17 and imparts an additional thrust equivalent substantially to one-half that of the main engine.

The present invention provides as additional equipment on the engine, other than the nozzles for supplying fuel in the vapor phase, a plurality of heat exchangers, the first illustrated at 30 and surrounding the air compressor where it may absorb heat from it and the air being compressed, thus substantially increasing the volumetric efficiency thereof as well as supplying needed heat at certain stages for the engine combustion system, as will be later described. The temperature of this compressor never reaches ranges dangerous to the materials of the exchanger so that it can be of a fixed position type and may be merely a hollow shell forming the outer casing of the compressor.

On each combustion tube 17 there is slidably mounted a heat exchanger 31, again being a hollow shell, adjustable longitudinally of the combustor so that it may be made to assume positions where different quantities and temperatures of heat are available for use thereby. As illustrated the exchangers 31 are all connected together by radial rods 31' and are through them subjected to longitudinal sliding on their combustor cans by the action of one or more power manipulators 32 in the form of cylinders or the like which may be supplied at selected ends with appropriate operating fluid, such as air or liquid.

Similarly operable by actuators 33 is the conical heat exchanger 34 surrounding the forward zone of the after-burner. This exchanger may be moved to withdraw it completely from contact with the conical portion 35 at the expanding entrance to the after-burner and the jet tube.

Each representative portion 10 and 11 or components of the aircraft subject to such excessive heating that artificial cooling is required for safety is shown containing a coil 37, 38 respectively, for a suitable refrigerant which is circulated thereto by means of conduits 39 through a suitable expansion valve 40. The refrigeration system is completed by means of compressor 41, a plurality (number unlimited) of condenser coils 42, 43 and 44, and liquid receiver 45. The suction side of the compressor is connected to one of the conduits 39 and the receiver to the other, with the coils 42, 43 and 44 arranged between the compressor and receiver.

Since the temperature in the vulnerable portions of the aircraft resulting from aerodynamic heating may reach a thousand degrees F. or more, the refrigeration operation is somewhat different, in degree only, from those in wider use, for here cooling even a few hundred degrees will be extremely helpful and low temperatures in the cooling coils or evaporators are not necessary.

For the sake of convenience in illustration, only a single refrigeration system has been illustrated, but it will be obvious that if various temperatures are needed other than those for cooling exposed components of the craft, such as for cabin conditioning, instrument and radio cooling and the like, separate refrigeration systems having different temperature ranges appropriate to their particular use may be provided. Then instead of using a plurality of condensers 42, 43 and 44 in series, each may be used for an individual refrigeration system with or without the other system components shown. This is particularly appropriate in connection with the system about to be described because each of these condenser coils is a part of a heat exchanger 50, 51 and 52, respectively, shown here as a tank or reservoir in which the coil is immersed, although obviously co-axial coils could be as readily used for the purpose. These tanks are used for the vaporization of the fuel from the main fuel reservoir 54, from which fuel is delivered by a suitable pump 55, or hand booster 56 if needed, through conduit 57, first to tank 50 and then by way of liquid pump 58 to tank 51, liquid pump 59 and tank 52, etc. Pumps 55, 58 and 59 are suitably automatically controlled and provide isolation for the pressures in the several tanks.

At operational velocities capable of supplying adequate aerodynamic heat to the refrigeration system, fuel from the reservoir 54 is evaporated in successive stages, not necessarily of the number illustrated, and the various fractions of vapor, generated in the several tanks 50, 51 and 52, at different pressures and temperatures, are withdrawn by vapor pumps 62, 63 and 64, respectively, which serve not only to remove the vapor as rapidly as it is formed, but may materially reduce the pressures within the respective tanks to increase the rates of vaporization therein at the available temperatures as well as determine the percentage or fraction of fuel vaporized in each of the successive tanks by suitable controls for the suction pressures of the pumps. Fuel vaporization may be adjusted in each vaporizer to provide desired quantity of cooling at any selected temperature as required in different parts of the aircraft as heating loads change.

As viewed in Fig. 1, tank 50 will vaporize the more volatile portions of the fuel because, by reason of refrigerant counterflow, the temperature available therein from compression and from the craft surfaces is least, the maximum heat having been taken out in the lowermost tank 52 where the most difficultly vaporizable fractions of the fuel are treated. In the same manner the second fraction will be removed in tank 51 and so on. Whether or not all of the fuel, needed for operation and supplied at the proper rate by known controls for pump 55, will be vaporized in the several tanks will depend on its characteristics, on the temperatures and quantities of heat available, and whether or not its gumming characteristics are such that this can be practically done. If not all vaporized the residue in liquid form will be withdrawn from the lowermost tank by a liquid pump 65. In some applications, use of different refrigeration circuits and refrigerants may be advantageous because more flexible, since they permit use of low boiling refrigerants with the more volatile fraction of the fuel, etc., and the amount of high temperature refrigerant can be reduced to a minimum.

Pumps 55, 58, 59, 62, 63, 64 and 65 not only provide a controlled pressure in each tank for facilitating evaporation but they are arranged to build up an adequate pressure to, at least, supply vapor to the burners 26 in the after-burner, where the existing pressure is relatively low. The output of pumps 62, 63 and 64 may, as shown, be combined to deliver into the conduit 66 leading, through apparatus later to be described, to the manifold for burners 26 and to the vapor pump 67 capable of supplying the necessary high pressure to force the vaporized fuel through burner jets 20 into the combustors where a relatively high pressure exists resultant from the compressor and the burning therein. Pressure from pump 67 is, however, much lower than that necessary for operation with liquid fuel where several hundred pounds pressure in excess of that in the combustor cans is needed to achieve the fineness of vaporization desired for proper burning. The manifolds of the two sets of burners 20 and 21 in the combustor cans are connected respectively by conduits 70 and 71 to the vapor and liquid outlets of the combustion regulating valve 72 arranged to apportion vapor and liquid and control the quantity of fuel supplied to the respective burners in accordance with their demands by manual regulation or otherwise and here the conduit 70 interposes the vapor pump 67 previously mentioned for building up the vapor pressure to an amount adequate to introduce it into the high pressure air in the combustor cans.

In a like manner the manifold for vapor jets 26 in the after-burner is connected by conduit 74 to the vapor outlet of valve 75 and the liquid jets 27 have their manifold connected by conduit 76 to the liquid outlet of this valve, which may be of the same type as valve 72 but having controls responsive to the after-burner thermal control setting of known type.

Vapor is supplied to the vapor sides of valves 72 and 75 through conduit 77 having several sources of supply. At the left it is connected by conduit 78 to the vapor outlet of the vapor-liquid separator 79 supplied from manifold 66 combining the outlets of pumps 62, 63 and 64 through thermally controlled valve 80. Any liquid, resulting from pressure or temperature caused condensation, is separated out in 79, is delivered by conduit 81 to heat exchanger 30 surrounding the engine air compressor where this liquid, which has proven to be vaporizable in the heat exchanger of the refrigeration system, is changed back to vapor and heat is extracted from the compressor thus increasing its efficiency. Output of exchanger 30 passes through line 82 to a second separator 83 whose vapor output combines with that of separator 79 to supply line 77 while the liquid output is delivered by line 84 to two-way valve 85 which when set in position "one" delivers to conduit 86 and branches 87, 88 in parallel to heat exchangers 31 and 34, the outputs of which are fed by lines 89 and 90 into common vapor line 77 but each first passes through heat sensing elements 91, 92, respectively, the first controlling the actuators 32 for the combustor heat exchangers and the second the actuators 33 for the after-burner heat exchanger whereby these are adjusted to assure vapor output from their respective exchangers at the desired temperature, thereby further augmenting the heat delivered to the engine.

Fuel not vaporized by the hot refrigerant and reduced pressures in exchangers 50, 51 and 52 is removed by pump 65, previously mentioned, which delivers into conduit 93 through temperature sensing mechanism 94 and thence to main liquid pump 95 which delivers it to the inlet of two-way valve 96 capable of selectively delivering in setting "one" all of the liquid to compressor heat exchanger 30 through conduits 81a and 81 from which portions not vaporized may eventually reach the other engine heat exchangers if desired, or in setting number "two" to direct all of the liquid into conduit 97 connected to the liquid sides of regulating valves 72 and 75. Conduit 97 is also connected, by means of conduit 98, to valve 85, which in setting number "two" delivers the liquid from pump 95 into the combustor and after-burner heat exchangers, if it has been ascertained that the residue liquid is not gummy. Otherwise this valve is set in position number "one," taking only gum free liquid from conduit 84 to the same exchangers and diverting liquid from series connected pumps 65 and 95 to the liquid sides of regulator valves 72 and 75.

Various conditions of operation determine different settings of the several controls already described. The simplest condition of operation is assumed first, i.e., that the craft is in high altitude, supersonic flight where the heat exchangers in the refrigeration system are receiving aerodynamic heat from the plane surfaces, as previously described, and pumps 62, 63 and 64 are removing the respective vaporized fuel fractions from these exchangers, compressing it to produce pressure above that in the after-burner in manifold 66 which combines the flow and leads it through valve 80 to separator 79, from which the vapor portion of the fuel flows by conduit 78 to join the flow from separator 83 to supply the vapor line 77 leading to the regulating valves 72 and 75.

Any liquid condensed as a result of recompression and temperature change is removed through line 81 from separator 79 and since it is completely vaporizable is fed to exchanger 30 without fear of gumming. The fuel vapor from exchanger 30 is conducted to separator 83 which removes any remaining liquid and delivers its vapor into line 77, leading to the vapor side of control valves 72, 75. Liquid from separator 83 is led by conduit 84 to valve 85 set in position "one" and delivered to the vaporizing exchangers 31 and 34, the vapor discharge from which is led through heat sensing elements 91 and 92, respectively, to control the amount of heat delivered to the exchangers as previously mentioned. This vapor combines with that from separators 79, 83, in conduit 77 to supply the vapor sides of the metering or regulating valves 72 and 75.

Since the after-burner pressure is low, vapor from valve 75 may, if required, be fed directly to nozzles 26 through conduit 74, but the vapor flow to burner nozzles 20 in the combustors must be raised to a higher pressure by pump 67 in outlet line 70 from the vapor side of metering control valve 72, which then builds up sufficient pressure to introduce the vapor into the combustors for burning therein. Quantity control is effected by any known form of regulation of vapor supply separately to the burners and coordination of liquid fuel quantity pumped by 55.

Should the fuel be of such a character as to leave a heavy gummy residue, pump 65 may be adjusted to remove the dangerous portion of the fuel in liquid form from the last evaporating stage 52, transferring it through temperature sensing element 94 which recognizes the temperature obtained by the fluid from aerodynamic heating under existing flight conditions and sends impulses to actuator 100 to hold open vapor valve 80. The liquid fuel flows through check valve 101 into main pump 95 whose output is fed through valve 96, set in position "two" to manifold 97 delivering to the liquid side of regulating valves 72, 75. Valve 72 is preset to maintain just enough liquid flow to remove the gummy portion of the liquid fuel when the fuel demand system calls for complete closure of the liquid side of valve 72. This fuel is fed by pump 95 to conduit 71, through check valve 102 to the liquid burner nozzles 21 in the combustor cans. Should the fuel be of negligible gum content valve 96 is set in position "one" which routes all of the liquid through the air compressor exchanger 30 and subsequently if desired through the other two exchangers in which all portions of the fuel are vaporized regardless of the cooling demand. In this case valve 72 acts solely as a vapor metering valve.

Under the conditions just described but with the after-burner inoperative, should additional thrust be required from the propulsive unit the vapor control for valve 75 is manually set so that vapor is delivered in adequate quantity through conduit 74 to burners 26. This valve may then be put under control of the after-burner temperature if desired. The total vapor demand under these circumstances will determine the rate at which fuel pump 55 delivers fuel to the refrigeration exchangers, and should these be unable to supply adequate vapor quantity then adjustments are made to supply additional vapor through the agency of the heat exchangers supplied through the action of pump 65 which is increased in speed to deliver additional liquid to valve 96 set in position "one." A sufficient quantity of liquid fuel delivered to exchanger 30 may overtax it and large quantities of liquid will be fed to separator 83. With sufficient heat available in the engine this liquid is fed through valve 85 in position "one" to exchangers 31 and 34 which vaporize it and deliver the vapor to valves 72 and 75 to supplement that from the refrigerator exchangers. When the after-burner is no longer needed it may be eliminated by reversing the above operations.

To start the turbo engine from a cold condition fuel pump 55 is energized to maintain heat exchangers 50, 51 and 52 provided with an adequate quantity of fuel and pumps 58, 59, 62, 64, 65, 67 and 95 are conditioned for operation. However temperature sensing elements 91, 92 under cold conditions will, through their actuators have set heat exchangers 30 and 34 to maximum heating positions and actuator 100 will have closed vapor valve 80. Valve 96 is manually set to position "two" which directs liquid flow from pumps 65 and 95 into the liquid side of metering valve 72, which may be provided with some form of manual starting adjustment. The starter and ignition circuits conventional to such jet engines are energized and pump 95 forces high pressure liquid through valve 96 and cracked valve 72 into the liquid nozzles 21 of combustors 17 where it is ignited and starts to drive the turbine and its compressor. When suitable speed is achieved the starting circuit may be deenergized and a thermal control on valve 72 manually set to an "idle" position. When this control of the liquid side of valve 72 takes over and the turbine r.p.m.'s increase the starting adjustment may be turned off and the thermal control gradually advanced to a high idling position under which condition the missile or craft is ready for takeoff "check" proceedings.

Assuming now, for the sake of the next portion of the description, that the turbo-jet is installed in a missile intended for a journey of no return, under which circumstances gumming from the fuel in the short length of takeoff and climbing flight may be considered negligible. To ready the missile for takeoff, the two-way valve 96 is switched very slowly from position "two" to position "one" to keep the engine running on liquid fuel until the now heated exchanger 30 is filled and outflow has been established through separator 83 which will select the hot vapor portions and route them to the vapor side of liquid vapor valve 72 adjusted for thermal control. The vapor from jets 20 ignites and when the engine is operating satisfactorily, valve 96 is moved fully to position "one" and the thermal control of the vapor liquid metering valve 72 is advanced to the lower run position. The main engine is now running substantially solely on vapor supplied by the heat of air compression. Any liquid from separator 83 is directed by valve 85 to the liquid side of valve 72 and then through 71 to the main liquid burners 21.

After an equilibrium rotation speed is established the two-way mixing valve 85 is moved very slowly from position "one" to position "two" to permit exchangers 31 and 34 to be filled with liquid and vapor and establish a stabilizing flow of vaporized fuel to the vapor side of valve 72 and also to the closed vapor regulator 75.

When running continues smooth in position "two" the valve 85 will be left in this position and the main burners of the engine will operate wholly on vapor pumped through valve 72 by pump 67, the vapor side of this valve now acting as a pure vapor metering valve.

Still assuming a missile, the guidance system is turned on and appropriate input signals are furnished to advance the thermal control on metering valve 72 for full power vapor setting. After the turbine has reached peak r.p.m., the takeoff input signal will activate the thermal control of metering valve 75 which provides vaporized fuel to the after-burner. Complete full power takeoff is now available and the missile is launched in its conventional manner, continues to climb at full power to some altitude where the guidance signal system causes the craft to level off, and it will pick up speed under the drive of the main and after-burners until large scale aerodynamic heating results which causes the fuel to be heated as it passes through the heat exchangers 50, 51 and 52. If refrigeration system 40, 41, 45 is installed the compressor will be started. Temperature sensing element 94 will note when vaporizing temperature is reached and actuator 100 opens vapor valve 80, permitting vapor pressure pumps 62, 63 and 64 to pump off the vapors from the exchangers 50, 51 and 52 into separator 79, as hitherto described for normal high speed flights and from here on the operation is as previously described. It will be noted that only during takeoff and climbing phases are the heat exchangers for the hot parts of the engine subject to any gumming. Thereafter as previously described, if they are needed they are subjected only to fuel which has previously been vaporized and hence is proven gum free.

For piloted aircraft it is assumed that fuel gumming characteristics are such that objectionable deposits might occur in the hotter burner and after-burner exchangers and hence unfractionated fuel will be kept away from these exchangers by adjustment of two-way valve 85 into position "one" to direct liquid fuel portions from separator 83 directly into the liquid metering side of valves 72 and 75. Starting will be the same as for the missile motor up to where the starters are disengaged. The thermal control of the liquid side of valve 72 is then moved to "idle" position and when the engine responds with higher r.p.m., the "start" adjustment will be turned off and turbine r.p.m's. should increase from the "run" rate as the thermal control of valve 72 is advanced to the "lower run" position. Valve 96 is then moved very slowly to position "one" to fill the compressor heat exchanger 30 which will direct a mixture of liquid and vapor to separator 83 where the liquid portions will be by-passed by valve 85 to the liquid metering sides of valves 72 and 75. The vapor enters pipe 78 and is directed to the vapor sides of valves 72 and 75. The compressor is brought to full speed by advancing the thermal control on the vapor side of valve 72 to full power position and if the craft is ready for take-off the thermal controls for both sides of valve 75 are advanced from "off" position, permitting liquid and vapor fuel to be metered through this valve into both sets of after-burner jets. The full flow of fuel to the compressor exchanger will tend to remove part of the heat of compression from the air flow, which increases compressor efficiency. The available power for the plane is augmented considerably during the initial period of takeoff and full power flying by this added feature. On reaching high altitude the craft is leveled off and will pick up speed so that large scale aerodynamic heating will cause the fuel to be heated as it passes through the exchangers 50, 51 and 52. Temperature sensing element 94 detecting when the vaporizing temperatures are reached causes vapor valve 80 to open, permitting vapor pumps 62, 63 and 64 to pump off the vapors in exchangers 50, 51 and 52 into separator 79. When the operation has stabilized, residue liquid fuel delivered by pump 65 will presumably have a heavy concentration of gum so valve 96 will be set to avoid routing this portion of the fuel to the compressor exchange. It will on the contrary pass through the liquid side of valve 72 and directly to the liquid nozzles 21 in the combustor 17, and dependent on the setting of the control for the liquid side of valve 75 may be also directed to the after-burner nozzles 27. All liquid, however, that is condensed from vapor and hence free from gum is separated in the first sepaartor 79 and goes through the compressor exchanger 30. It is then routed through separator 83 and the liquid goes to valve 85 which is placed in position "two" to permit the flow of liquid to exchangers 31 and 34 which are actuated as before to hold temperature at the prescribed value.

The various forms of controls which have been mentioned particularly in connection with valves 72 and 75 may be manual, thermally responsive or otherwise rendered automatic in accordance with well known devices of this character already in use for other purposes. Each of valves 72 and 75 may have separate controls for the vapor and liquid sides thereof and/or interconnections between their two sides to insure the proper quantity (total) of fuel delivery to the respective main and after-burner combustors.

The operation of the plane is always under the control of the pilot who can regulate the rate of fuel delivery at any time to determine the speed of the craft.

The embodiment of Fig. 2 represents a simplification of the invention, shown applied to the same general character of turbo-jet engine as illustrated in Fig. 1, although in keeping with that embodiment the invention and disclosure of Fig. 2 is not limited to engines of this character. In fact it is even more susceptible than the development of Fig. 1 to use in more simplified types of jet engines, such as those designated ram-jets, pulse-jets and the like, which have a complete absence of rotating parts comprising turbine and compressor, reliance being placed on aircraft velocity to achieve compression of the air for burning the fuel.

In Fig. 2 the basic elements of the illustrated turbo-jet are the same as in Fig. 1 and have been given the same reference characters prefixed by a "1." In this embodiment of the invention simplification is achieved by supplying the main combustors 117 with burner jets (not shown) adapted solely for the consumption of fuel in the liquid phase. No fuel supply has been illustrated for these burners since it may be of the more or less conventional type used at the present time in most turbo-jet engines of the general type illustrated in the figures. Such apparatus may include the various control means, pumps, regulators, throttles and the like, whereby the operator or auto-pilot is in full control in so far as his control is consistent with existing engine conditions. The compressor of the engine is, however, supplied with a heat exchanger 130 as in the first embodiment and the forward end of the jet tube 125 in the area forming the combustion space for the after-burner is fitted with a heat exchanger 134 adjustable from contact position with the conical surface 135 of the combustion chamber shell to a separated position under the action of the pneumatic or hydraulic actuators 133. Jet engine types using aircraft velocity compression have air intake configurations producing velocity-to-pressure change and thus subject to heating the same as the compressor of the drawing. Such an intake device may be fitted with a heat exchanger equally as effective as 130 surrounding the compressor.

The after-burner, or in the case of ram and pulse-jets, the only burner, is provided solely with vapor burner-jets 126 receiving vapor from a suitable manifold by way of conduit 210 from the compression end of a combined vaporizing and pressure pump 212, suitably driven at controllable speed. Regeneration is effected by virtue of the heat imparted to the fuel before burning.

The principal vapor inlet to pump 212 is by way of conduit 213 which leads from the top of fuel evaporator tank 150 which corresponds to any one or all of the evaporator tanks 50, 51 and 52, illustrated in Fig. 1 where it was pointed out that the number used was either optional or dependent on the type of fuel and the amount of cooling required. This tank is continuously supplied to a predetermined level with liquid fuel through pipe 157 from tank 154 through the agency of pump 155 of conventional construction and controllable to regulate fuel delivery rate.

A suitable heat exchanger coil 142 is immersed in the liquid fuel in tank 150 and connected by conduits 139, containing an appropriate refrigeration liquid, to a source of heat such as a sustaining or control surface of an aircraft subject to aerodynamic heating at high velocities. If desired a mechanical refrigeration system may be interposed as suggested in connection with Fig. 1.

Normal high velocity (supersonic) operation with large quantities of aerodynamic heat available from the heat exchange coil 142 to evaporate the fuel in evaporator 150 provides adequate volume of vapor phase fuel to conduit 213 because of the reduced pressure maintained by suction pump 212. This pump readily discharges the vaporized fuel at suitable pressure to the vapor burner nozzles 126 in the after-burner with a minimum of work since the after-burner combustion pressure is approximately 3 atmospheres and only slightly more than this pressure is needed to deliver the vaporized fuel.

Assuming an operating level of 75,000 feet, the atmospheric pressure is but .511 p.s.i. and hence the after-burner combustor pressure 1.533 p.s.i., whereas the combustor pressure of the basic turbo-jet in flight at Mach 4 at the same altitude is probably in excess of 100 p.s.i.

Thus although it may be at times necessary to use considerable power to produce a sufficiently low pressure in tank 150 to vaporize fuel as rapidly as it is consumed, the power required to recompress it for feeding to the after-burner will not be excessive. Obviously the speed of pump 212 may be controlled manually, thermostatically or otherwise by the desired quantity of fuel for delivery to the after-burner, which receives all of its fuel in vaporized form.

On many occasions it might be desirable to operate the after-burner before aerodynamic heat is available to vaporize fuel in evaporator 150. The basic engine, however, will always be in operation prior to starting the after-burner. In fact the very name "after-burner" suggests the need for this. Under these circumstances ample heat is available both in the compressor heat exchange 130 and in the after-burner heat exchanger 134 (in the path of the exhaust gases from the turbine), either or both of which may be used to vaporize liquid fuel for early operation of the after-burner in the absence of aerodynamic heat.

Since a substantial increase in efficiency of operation of the main engine is achieved by cooling the compressor, whereby greater quantities of air may be handled, means are provided to first use its heat exchanger for the conversion of liquid fuel to the vapor phase for burning in the after-burner. Where the propulsion unit is a ram or pulse jet device the exchanger 130 may comprise a jacket about the ram air compressor and this is available to vaporize fuel for the only burners in a manner similar to that about to be described.

When fuel is not being heated in evaporator 150 by aerodynamic heat no substantial amount of vapor is provided through conduit 213 to suction pump 212 and the temperature in 150 is low. Either of these conditions affects thermal responsive control 218 to drive the motor of pump 217 receiving liquid fuel through pipe 216 from the evaporator. This control gradually slows the pump as the temperature in 150 or vapor line 213 rises to an effective point. When the pump 217 is operating it supplies liquid fuel to conduits 219 and 220, leading respectively to valves 221 and 222, the former being connected by conduit 223 to compressor jacket 130 and the latter by conduit 224 to after-burner heat exchanger 134. The first of these has vapor takeoff conduit 226 and the second vapor takeoff conduit 227 both leading to the vapor intake side to pump 212.

When valve 221 is open in response to high temperature at the thermal element 230, mounted on the compressor heat exchanger 130, valve 222 is closed by means of interconnecting link 232. This insures diverting liquid fuel first to the air compressor heat exchanger for vaporization to supply the after-burner by way of conduit 226, pump 212 and conduit 210, for this increases the volumetric efficiency of the compressor and hence the overall efficiency of the main engine.

Should the vapor demands of the after-burner jets as supplied through pump 212 exceed the vaporization capacity of heat exchanger 130, this latter would tend to flood with liquid fuel, reducing the temperature at sensing element 230 and causing a partial closure of liquid fuel valve 221 and simultaneously a partial opening of valve 222. This diverts some liquid fuel into conduit 224 and after-burner heat exchanger 134 which is amply supplied with heat both from the main burners and the after-burner. Therefore additional liquid fuel is vaporized to satisfy the demand of the after-burner.

In order to prevent the overheating of after-burner heat exchanger 134 at times when it is not vaporizing fuel or handling only small quantities, it is arranged to be withdrawn from contact with the conical surface 135 of the after-burner combustion chamber. Movement is imparted to the heat exchanger as in Fig. 1 by pistons connected through rods thereto and acting in cylinders 133. In one arrangement these pistons are urged toward the right by means of springs 235, one in each cylinder, thus tending to maintain the after-burner heat exchanger in maximum heat transfer position, from which it may be withdrawn under the action of a pressure fluid from pipe 236 under the control of a suitable valve 237. This valve is monitored by a heat responsive element 238 in contact with the surface of heat exchanger 134 and serves to insure against overheating of the latter. This prevents coking and detrimental clogging of the after-burner heat exchanger.

If during operation where at least a portion of the vaporized fuel is supplied from one or both of the heat exchangers on the engine, the aircraft should increase the velocity or otherwise generate additional aerodynamic heat capable alone of taking care of the vaporization of all of the necessary fuel for the after-burner, the supply of fuel to the heat exchangers is automatically discontinued under the action of temperature sensitive device 218 on the evaporator tank 150 for when the liquid in this tank becomes sufficiently heated this control stops pump 217 and cuts off the supply of liquid fuel to both heat exchanger valves 221 and 222, so despite the condition of these valves no liquid is delivered to their exchangers. However that already in them will be vaporized and removed under the suction of pump 212.

It will be appreciated that the operation of the after-burner in nowise conflicts with the normal operation of the basic engine with its standard supply of liquid fuel for the main combustors 117. Thus the pilot or autopilot has full control both of the basic engine and of the after-burner to get the response desired or essential for certain maneuvers.

The heat exchangers 131 shown on the main combustors in Fig. 2 may obviously be omitted or arranged to operate in conjunction with either or both exchangers 130 and 134.

I claim:

1. Apparatus for cooling aerodynamically heated components of aircraft and supplying fuel for the operation of a reaction jet engine therein comprising in combination, an aircraft having aerodynamically heated components, a reservoir on said aircraft for liquid fuel, means for continuously transferring heat from one of said components to a relatively fixed quantity of said fuel to vaporize a portion of it, means maintaining said quantity of fuel fixed and isolated from air, a vacuum pump associated with said quantity of fuel to maintain it at lower than atmospheric pressure and to remove vapor as rapidly as formed, conduit and control means associated with said vacuum pump to deliver said vapor to said engine for burning, and a source of compressed air for mixing with said vapor for burning in said engine.

2. The apparatus as defined in claim 1 having a two compartment heat exchanger, one compartment of which contains said quantity of fuel, a pump supplying said liquid fuel to said exchanger and a pump removing unvaporized fuel therefrom and said means to conduct heat to the other compartment of said exchanger from at least one of said aerodynamically heated components comprises a liquid and a pipe therefor.

3. The apparatus as defined in claim 1 in which the said engine has main engine burners and after-burners, means to deliver liquid fuel direct to the burners of the main engine for combustion with the compressed air therein and means to deliver said vaporized fuel to said after-burner for combustion with the excess air in the products of combustion of the main engine.

4. Apparatus for cooling an aerodynamically heated component of an aircraft having fluid therein and supplying vaporized fuel for use in the operation of an engine therein comprising in combination, a component positioned to be aerodynamically heated, an engine having burners and means to supply combustion air, a reservoir for liquid petroleum-derived fuel, a heat exchanger having two closed compartments, means to deliver liquid fuel from said reservoir through one of said compartments, means to maintain the absence of air in said compartment, means to deliver said fluid heated by said component to the other compartment to vaporize at least a portion of the fuel in the first compartment, and means to remove said vaporized fuel and deliver it to said engine burners as required to burn said fuel with said air in said engine.

5. The apparatus as defined in claim 4 in which a mechanical refrigeration compressor is interposed between the fluid heated by said component and the fluid in the other of said compartments to increase the cooling of said component and the heating of said fuel.

6. Apparatus including in combination, an aircraft having a component subject to aerodynamic heating and a power plant of the reaction jet type, a source of fuel liquid at atmospheric pressure in said aircraft, a heat exchanger having two isolated chambers, means to deliver liquid fuel from said source to one chamber of said exchanger, a refrigerant fluid in the other chamber, means to circulate said fluid from said other chamber to said component to absorb heat therefrom, to thereby vaporize said fuel in the exchanger, means to isolate fuel in said first chamber from atmosphere, means to mechanically remove the vaporized fuel from said chamber and means in said power plant to burn said vaporized fuel.

7. The apparatus of claim 6 in which the means to deliver liquid fuel from said source to one chamber comprises a pump, and a pump removes the vaporized fuel from said chamber, said last mentioned pump producing a pressure below atmospheric in said first chamber and means to deliver said vaporized fuel to the power plant at a positive pressure higher than that in the combustion chamber of said power plant.

8. The apparatus of claim 7 in which the power plant is equipped with means to burn vaporized and liquid fuel separately and simultaneously, a separator for said vaporized fuel and fuel liquefied by the provision of said positive pressure and means to deliver the separated fuel components to the respective burning means.

9. The apparatus of claim 8 in which a valve is interposed between the first chamber of the exchanger and the means for burning the vaporized fuel, a thermosensitive means adapted to close said valve when subject to below fuel vaporization temperature, and means exposing said thermo-sensitive means to the temperature of the fuel in said first chamber.

10. The apparatus of claim 9 in which a liquid fuel pump is connected to withdraw liquid fuel from said first chamber and direct it to said thermo-sensitive means, and conduit means for delivering said last mentioned fuel to said liquid fuel burning means.

11. The apparatus of claim 10 in which the said power plant is provided with a heat exchanger having a chamber positioned to be heated by operation of a portion of the plant, means to selectively deliver all or a portion of said last mentioned fuel to said last mentioned chamber for vaporization and means to deliver such vaporized fuel to the burning means therefor.

12. The apparatus as defined in claim 2 having at least two heat exchangers, means connecting the fuel compartments thereof in series, a liquid pump in said means separating said compartments, said means to conduct heat being arranged to heat said exchangers to successively higher temperatures counterflow to the liquid fuel delivered thereto.

References Cited in the file of this patent

UNITED STATES PATENTS

| | | |
|---|---|---|
| 2,082,850 | Schlumbohm | June 8, 1937 |
| 2,145,678 | Backstrom | Jan. 31, 1939 |
| 2,586,025 | Godfrey | Feb. 19, 1952 |
| 2,745,249 | Sanborn | May 15, 1956 |

FOREIGN PATENTS

| | | |
|---|---|---|
| 612,468 | Great Britain | Nov. 12, 1948 |
| 711,985 | Great Britain | July 14, 1954 |